(12) United States Patent
Kim (10) Patent No.: US 11,735,342 B2
(45) Date of Patent: Aug. 22, 2023

(54) METHOD FOR MANUFACTURING MAGNET MODULE

(71) Applicants: KOVERY CO., LTD., Hwaseong-Si (KR); Houng Joong Kim, Incheon (KR)

(72) Inventor: Houng Joong Kim, Incheon (KR)

(73) Assignees: KOVERY CO., LTD., Hwaseong-si (KR); Houng Joong Kim, Incheon (KR)

( * ) Notice: Subject to any disclaimer, the term of this patent is extended or adjusted under 35 U.S.C. 154(b) by 197 days.

(21) Appl. No.: 16/980,251

(22) PCT Filed: Mar. 15, 2019

(86) PCT No.: PCT/KR2019/003008
§ 371 (c)(1),
(2) Date: Sep. 11, 2020

(87) PCT Pub. No.: WO2019/203448
PCT Pub. Date: Oct. 24, 2019

(65) Prior Publication Data
US 2021/0035723 A1     Feb. 4, 2021

(30) Foreign Application Priority Data

Apr. 16, 2018   (KR) ................. 10-2018-0043840

(51) Int. Cl.
*H01F 7/02* (2006.01)
*H01F 41/02* (2006.01)

(52) U.S. Cl.
CPC ......... *H01F 7/021* (2013.01); *H01F 41/0266* (2013.01)

(58) Field of Classification Search
CPC .... H01F 7/021; H01F 41/0266; H01F 7/0221; H01F 13/003; H01F 41/005; H02K 15/12; H02K 15/03; H02K 41/031
See application file for complete search history.

(56) References Cited

U.S. PATENT DOCUMENTS 10,693,353 B2    6/2020  Shimura et al.
2008/0276449 A1  11/2008 Groendahl et al.
(Continued)

FOREIGN PATENT DOCUMENTS

EP    3032724 A1    6/2016
JP    2001-169527 A 6/2001
(Continued)

*Primary Examiner* — Mohamad A Musleh
(74) *Attorney, Agent, or Firm* — Birch, Stewart, Kolasch & Birch, LLP (57) ABSTRACT

A method for manufacturing a magnet module. The method may include injecting a magnet module including a plurality of magnetless magnets arranged in a straight line; and magnetizing the plurality of magnetless magnets mounted on the injected magnet module. The injecting of a magnet module may include mounting the plurality of magnetless magnets to a first part forming a frame of the magnet module in a mold frame including first and second mold frames molded inside to fit an external shape of the magnet module; injecting a resin in a liquid state into the mold frame; and separating the mold frame when the resin is hardened. The injecting of a magnet module may further include mounting a metal plate to a second part forming a base of the magnet module in the mold frame, before performing the step of injecting a resin in a liquid state into the mold frame.

6 Claims, 6 Drawing Sheets

(56) References Cited

U.S. PATENT DOCUMENTS

| | | | |
|---|---|---|---|
| 2009/0051227 A1* | 2/2009 | Kim | H02K 41/03 310/12.24 |
| 2010/0171374 A1* | 7/2010 | Sugita | H02K 41/031 310/12.17 |
| 2011/0221283 A1 | 9/2011 | Kawakami | |
| 2013/0049911 A1* | 2/2013 | Shimura | H02K 15/03 264/232 |
| 2016/0261177 A1 | 9/2016 | Shimura et al. | |

FOREIGN PATENT DOCUMENTS

| | | | |
|---|---|---|---|
| JP | 2004-135385 A | 4/2004 | |
| JP | 2004350419 A * | 12/2004 | |
| JP | 2005-39898 A | 2/2005 | |
| JP | 2005039898 A * | 2/2005 | |
| JP | 2006-42485 A | 2/2006 | |
| JP | 2006-54972 A | 2/2006 | |
| JP | 2002-531042 A | 9/2007 | |
| JP | 2010-183823 A | 8/2010 | |
| JP | 2012-216626 A | 11/2012 | |
| JP | 2012-217269 A | 11/2012 | |
| JP | 2013-63011 A | 4/2013 | |
| JP | 2014-504129 A | 2/2014 | |
| KR | 10-2011-0084329 A | 7/2011 | |
| WO | WO 2010/058500 A1 | 5/2010 | |
| WO | WO-2012026685 A2 * | 3/2012 | H02K 1/06 |

* cited by examiner

METHOD FOR MANUFACTURING MAGNET MODULE

CROSS REFERENCE TO RELATED APPLICATIONS

This application is the National Phase of PCT International Application No. PCT/KR2019/003008, filed on Mar. 15, 2019, which claims priority under 35 U.S.C. 119(a) to Patent Application No. 10-2018-0043840, filed in the Republic of Korea on Apr. 16, 2018, all of which are hereby expressly incorporated by reference into the present application.

TECHNICAL FIELD

This disclosure relates to a method for manufacturing a magnet module, and more particularly relates to a method for manufacturing a magnet module by an injection molding method, which is used in a linear motor and is composed of a plurality of magnets arranged in a traveling direction.

BACKGROUND ART

The linear motor has a structure that generates thrust between a mover and a stator facing in a linear shape. The linear motor of a permanent magnet type places a permanent magnet on one of the mover and stator and applies alternating multi-phase power to the other, so that electromagnetic force acts between them to generate thrust in a certain direction.

Most conventional linear motors have a structure in which a magnetic flux from a protruding pole of an armature core passing through a permanent magnet and a magnetic core forms a magnetic closed loop and generates attractive force and repulsive force to generate thrust. So, the permanent magnet is most often placed between the protruding pole and the magnetic core and attached to the magnetic core.

Figure 1:
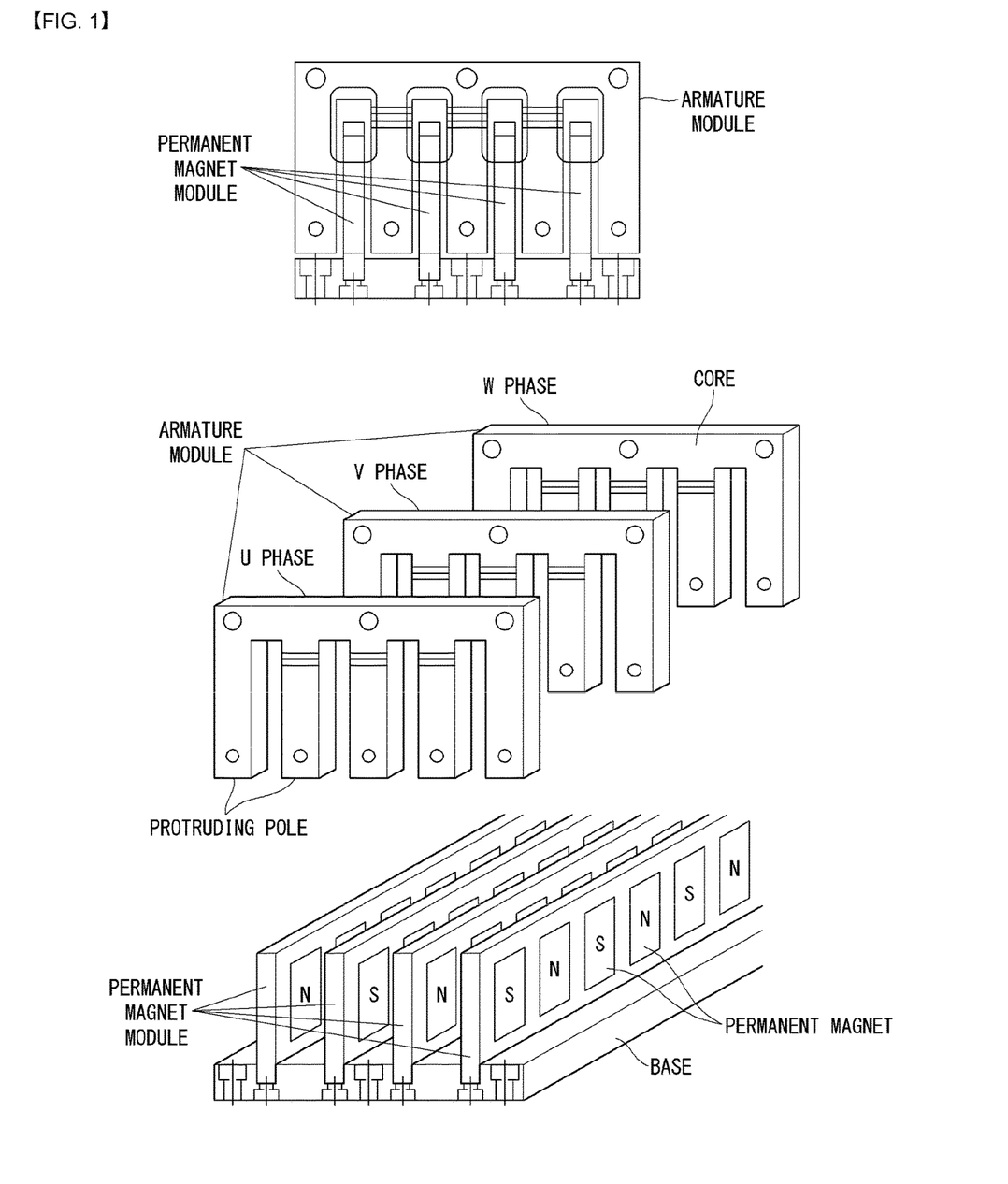
FIG. 1 shows an open-type linear motor described in application numbers KR 10-2010-0081522 and KR 10-2010-0129947 filed by the inventor of the present application.

FIG. 1 shows an open-type linear motor described in application numbers KR 10-2010-0081522 and KR 10-2010-0129947 filed by the inventor of the present application.

In FIG. 1, the cores of the armature modules of U/V/W phases are the shape of a straight line, and accordingly, the protruding poles protrude at a right angle from the core and are arranged side by side with adjacent protruding poles. And, the permanent magnets of secondary members also protrude between two side-by-side protruding poles toward the straight core. A plurality of permanent magnets arranged in a traveling direction may be fixed to a permanent magnet module, and between the protruding poles two or more permanent magnet modules are arranged side by side with each other. So, the base for supporting serves as a connecting member for connecting a plurality of the permanent magnet modules, and a plurality of the permanent magnet modules may be fixed to the base.

The linear motor in FIG. 1 constitutes a magnetic closed loop without the intervention of a magnetic core. That is, there is no magnetic core on a magnetic path, and a permanent magnet is directly placed on the magnetic path to connect the magnetic flux to form a magnetic closed loop.

Since the permanent magnet directly connects the magnetic closed loop in the linear motor of FIG. 1, a permanent magnet module may be assembled by inserting the permanent magnets into a plurality of openings formed according to the shape of the permanent magnets in a frame. Since a magnetic flux does not flow through the magnet module frame, the frame may be manufactured in an injection method using a non-magnetic material.

When a plurality of the permanent magnets are fixed to the openings formed in the frame, the magnetization direction of the permanent magnet is checked individually, an opening for fixing the permanent magnet whose magnetization direction is confirmed is determined, adhesive is applied to the inside of the opening or the rim of the permanent magnet, and the permanent magnet is fit through and bonded to the opening.

However, since the magnetic force of the permanent magnet is very strong, two magnets may stick together and it is very difficult to separate the two stuck magnets, the process of checking the magnetization direction is quite cumbersome. The adhesive applied to the inside of the opening or the rim of the permanent magnet will come out, so the assembled magnetic module will not have a smooth appearance. Thus, there are many work processes involved in assembling the magnet module, which is cumbersome and reduces work efficiency.

DISCLOSURE

Technical Problem

The present disclosure has been made in view of the above circumstances. It is an object of the present disclosure to provide a method for easily manufacturing a magnet module composed of a plurality of magnets arranged in a traveling direction of a linear motor and having no magnetic core.

Technical Solution

The method for manufacturing a magnet module according to an embodiment of the present disclosure may comprise: injecting a magnet module including a plurality of magnetless magnets arranged in a straight line; and magnetizing the plurality of magnetless magnets mounted on the injected magnet module.

In an embodiment, the injecting of a magnet module may comprise: mounting the plurality of magnetless magnets to a first part forming a frame of the magnet module in a mold frame comprising first and second mold frames molded inside to fit an external shape of the magnet module; injecting a resin in a liquid state into the mold frame; and separating the mold frame when the resin is hardened.

In an embodiment, the injecting of a magnet module may further comprise: mounting a metal plate to a second part forming a base of the magnet module in the mod frame, before performing the step of injecting a resin in a liquid state into the mold frame.

In an embodiment, a plurality of protrusions may protrude toward each other from the first and second mold frames to form base holes in the base, and the metal plate may be inserted between ends of the plurality of protrusions to be fixed to the mold frame.

In an embodiment, fins for fixing the plurality of magnetless magnets may be protruded in at least one of the first and second mold frames In an embodiment, when the plurality of magnetless magnets are a hexahedron having first and second surfaces and the first and second surfaces is perpendicular to a direction of magnetization of the plurality of magnetless magnets, the fins may be protruded from the at least one of the first and second mold frames to contact each of surfaces other than the first and second surfaces of the hexahedron.

The magnet module according to another embodiment of the present disclosure may comprise: a plurality of permanent magnets arranged in a straight line along a first direction, magnet polarity directions of the plurality of permanent magnets which are parallel to a second direction being alternatively arranged in the first direction; an injection molded frame to fix the plurality of permanent magnets; and an injection molded base in which a plurality of base holes are formed.

In an embodiment, the magnet module may further comprise a metal plate inserted into the base.

In an embodiment, the metal plate may have a shape that is longest in the first direction and a next longest in the second direction, and have holes formed at positions corresponding to the plurality of base holes.

In an embodiment, the base hole may be disposed at a position corresponding to a position between two adjacent permanent magnets in the frame, based on the first direction.

In an embodiment, the permanent magnet may be exposed to the outside, and the frame may protrude from a surface of the permanent magnet having a shape of a hexahedron in a direction away from the permanent magnet along the second direction at positions corresponding to edges of the permanent magnet, and protrude from the positions corresponding to the edges toward a center of the permanent magnet along the first direction and a third direction perpendicular to the first and second directions.

Advantageous Effects

Therefore, the manufacturing process of the magnet module is simplified to increase manufacturing efficiency. Also, the structure is possible in which the magnets in the magnet module are not exposed to the outside, so the surfaces of the magnets can be prevented from being damaged.

In addition, it is possible to prevent the magnetic module having a long length in a traveling direction from being bending in a direction in which a magnet flux advances. By minimizing the gap between the magnet and armatures, it is possible to minimize leakage of the magnetic flux to the outside.

Also, it is possible to prevent the magnet from separating from the frame of the magnet module even if the magnet is injected while exposed to the outside.

MODE FOR INVENTION

Hereinafter, a method of manufacturing a magnet module according to the present disclosure will be described in detail with reference to the accompanying drawings.

In the present disclosure, the magnet module including a plurality of magnets that are not magnetized are injection molded and the magnets mounted on the magnet module may be magnetized with a magnetizer, so the magnet module applied to a linear motor having a structure similar to FIG. 1 may be manufactured.

Figure 2:
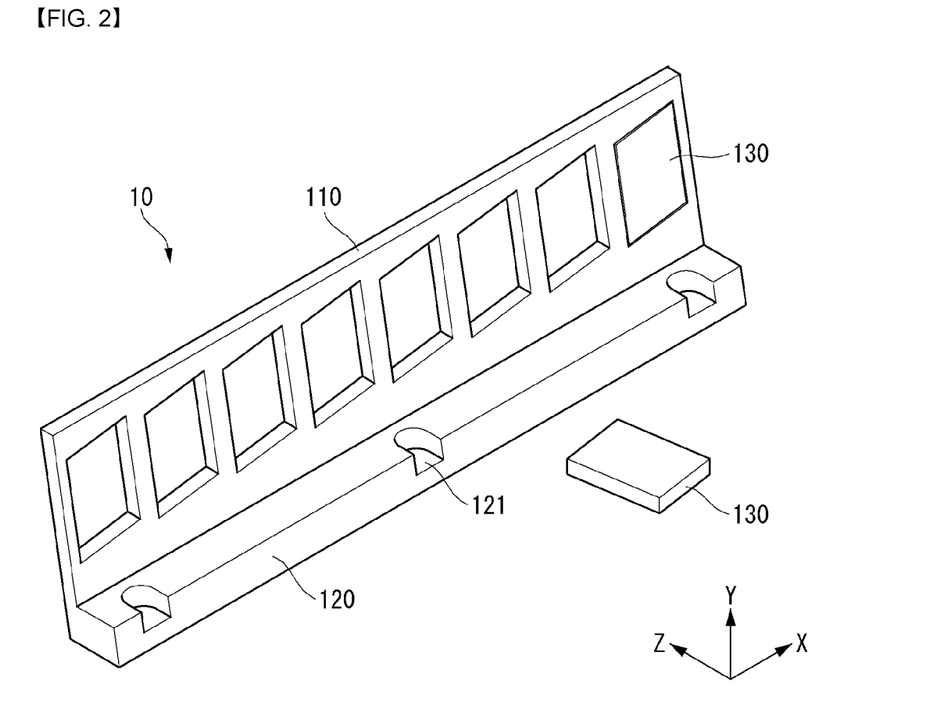
FIG. 2 shows a magnet module manufactured by an injection molding method according to an embodiment of the present disclosure.
Figure 3:
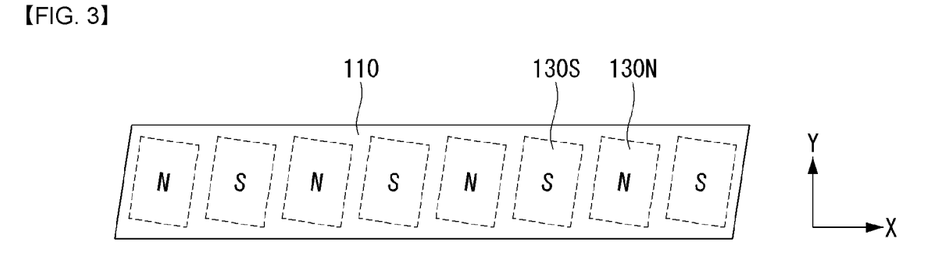
FIG. 3 shows a frame to which permanent magnets are fixed in the magnet module of FIG. 2.

FIG. 2 shows a magnet module manufactured by an injection molding method according to an embodiment of the present disclosure, and FIG. 3 shows a frame to which permanent magnets are fixed in the magnet module of FIG. 2. Two or more magnet modules may be continuously arranged in a traveling direction of a mover.

The magnet module 10 may comprise a frame 110 on which a plurality of permanent magnets 130 are mounted and a base 120 on which holes 121 for engaging the based to a stator. The frame 110 and the base 120 may be formed in one body by injection molding. For example, a plurality of permanent magnets 130N and 130S are disposed in the frame 110 which is made of an injection material such as plastic, while their magnetic poles being alternated along a traverse direction (X direction), that is, the moving direction of a mover. And, the magnet module 10 may be manufactured such that the permanent magnets in the magnet module 10 are not exposed to the outside.

The plurality of cuboid permanent magnets are arranged in a slightly inclined state, in which the sides of the cuboid are not aligned parallel to the transverse direction (X direction) to reduce velocity ripple. The magnetization direction of the permanent magnets 130 is perpendicular to a traveling direction of a mover, and is a direction protruding or entering an XY plane, that is, a direction perpendicular to the XY plane.

Figure 4:
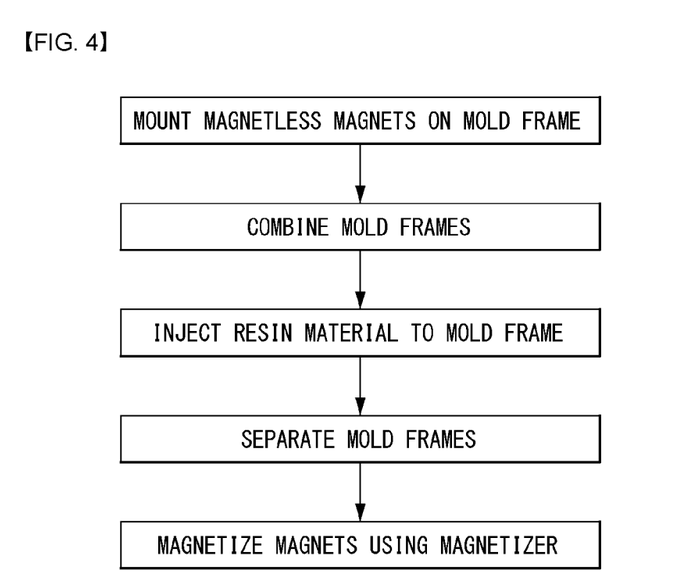
FIG. 4 shows an operation flow chart for the process of manufacturing the magnet module according to an embodiment of the present disclosure.

FIG. 4 shows an operation flow chart for the process of manufacturing the magnet module according to an embodiment of the present disclosure.

First, magnetless magnets are mounted on a mold frame for injection molding. The magnetless or non-magnetic magnet means a magnet without magnetic force, and means a state in which a material required for a magnet is compounded to the magnet but no magnetic force is injected to the material. Since magnets are magnetless, magnetless magnets of a same size may be arbitrarily mounted on the mold frame without needing to consider their magnetization directions.

Figure 5:
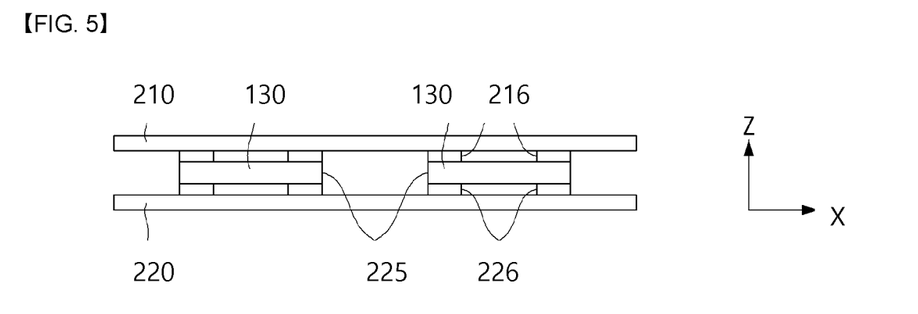
FIGS. 5 and 6 illustrate a method of fixing magnetless magnets to a mold frame to manufacture the magnet module by injection molding.
Figure 6:
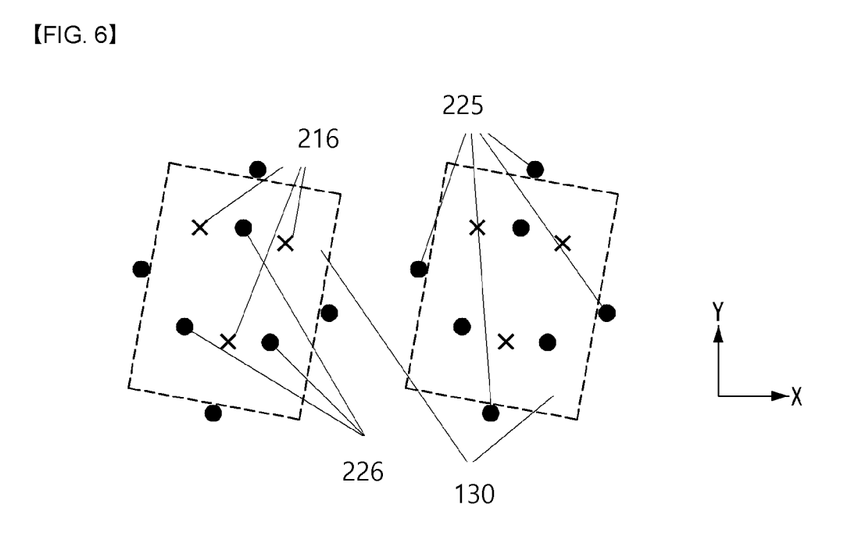

FIGS. 5 and 6 illustrate a method of fixing magnetless magnets to a mold frame to manufacture the magnet module by injection molding.

A mold frame may be composed of at least two parts, that is a first mold frame and a second mold frame the inside of which are molded to fit the external shape of the magnet module 10. Fixing pins 216, 225 and 226 are formed inside the mold frame in a state protruding from the inner surface. The fixing pins are for fixing the magnetless magnets 130 in their proper places when high temperature liquid resin such as plastic is injected at a high pressure into the space between the first mold frame 210 and the second mold frame 220 during an injection molding process.

In FIGS. 5 and 6, first fixing pins 216 protrude vertically from an inner surface of the first mold frame 210 to support a magnet 130 in −Z direction, second fixing pins 226 protrude vertically from an inner surface of the second mold frame 220 to support the magnet 130 in +Z direction, and third fixing pins 225 protrude vertically from at least one of the first and second mold frames 210 and 220 to supports the magnet 130 in X direction, Y direction or a combination direction of a predetermined ratio of the X direction component and the Y direction component.

The magnetless magnet 130 is in the form of a cuboid, and is mounted on the inside of the frame 110 in a state in which first/second surfaces having the largest area (the first and second surfaces face each other or are parallel with each other) are parallel to the XY plane. Since a magnetic flux flows in the Z direction when the magnet module 10 is mounted on the linear motor of the structure of FIG. 1, it is necessary for the first surface of the magnet 130 to remain parallel to the XY plane or perpendicular to the Z direction.

For this, as shown in FIGS. 5 and 6, it is advantageous to dispose the first and second fixing pins 216 and 226 such that three or more ends of respective first and second fixing pins 216 and 226 contact the first and second surfaces of the magnet 130 with respect to the Z direction, the center of gravity of the plurality of first fixing pins 216 and the center of gravity of the plurality of second fixing pins 226 are respectively disposed in the center of the first or second surface of the magnet 130 with respect to the XY plane, and the first and second fixing pins 216 and 226 are evenly disposed on the first or second surface.

Also, as shown in FIG. 6, the first and second fixing pins 216 and 226 may be arranged such that the first positions of the first fixing pins 216 and the second positions of the second fixing pins 226 are not identical to each other with respect to the XY plane, and the first positions and the second positions are point-symmetrical relative to the center of the first or second surface or symmetrical based on a straight line passing through the center of the first or second surface.

As shown in FIG. 6, when the magnet 130 is a rectangle having a longer side with respect to the XY plane, three first fixing pins 216 and three second fixing pins 226 are disposed for each magnet 130 such that the first fixing pins or the second fixing pins are respectively arranged in the shape of an isosceles triangle with a hypotenuse being longer than a base and the first isosceles triangle formed by the first fixing pins 216 and the second isosceles triangle formed by the second fixing pins 226 are alternately arranged each other.

As shown in FIG. 6, the plurality of third fixing pins 225 are arranged to contact each side of a rectangle formed by the first or second surface of each magnet 130 with respect to the XY plane or disposed to contact one or more surfaces other than the first and second surfaces.

The magnet 130 may not be a cuboid and may be a hexahedron in which the first/second surfaces of the XY plane are parallelograms. The embodiments related to the fixing pins of FIGS. 5 and 6 may be applied to this case without modification. And, the planar shape of the magnet 130 is not limited to a rectangular shape or a parallelogram shape, and may be a rhombus, a circular shape, an ellipse, and the like.

After attaching the magnetless magnet 130 to one of the first and second mold frames 210 and 220, the two mold frames 210 and 220 are combined. An inlet (not shown) for injecting a resin in a liquid state constituting the frame 110 and the base 120 is provided on one of the first and second mold frames 210 and 220 or a combined cross-section of the two mold frames. Also, an air hole (not shown) through which the air inside of the two mold frames is to be escaped is provided so that the resin penetrates into every corner of the inside of the two mold frames.

After combining the first and second mold frames 210 and 220 in a state in which the magnetless magnets 130 are fixed, the frame 110 and the base 120 of the magnet module 10 are molded by injecting a resin material in a high temperature liquid state through the inlet provided on the two mold frames.

When the resin material cools and becomes a solid state, the mold frames 210 and 220 are separated to obtain the magnet module 10 having a plurality of magnetless magnets 130 mounted therein. The unnecessary portion of the magnet module 10 is removed and trimmed to a final appearance.

Thereafter, the magnetless magnets 130 embedded in the frame 110 are magnetized using a magnetizer.

Figure 7:
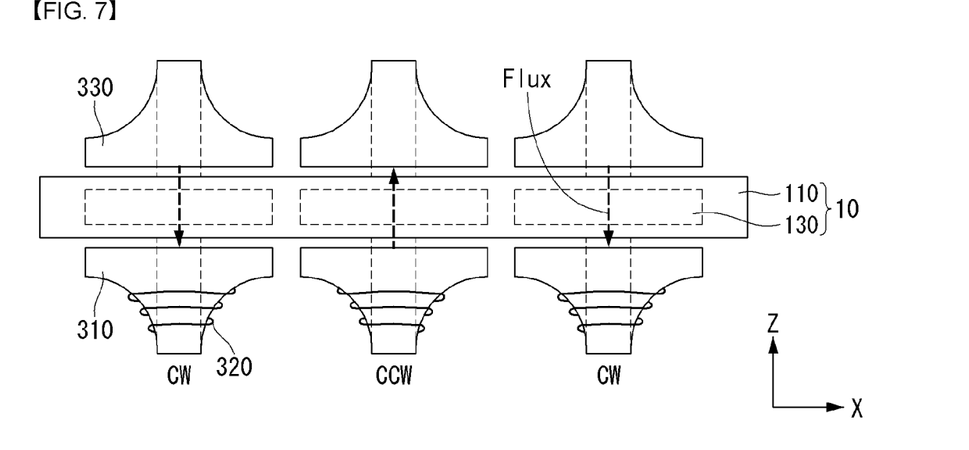
FIG. 7 shows an example of a method for magnetizing magnetless magnets included in the frame of the magnet module.

FIG. 7 shows an example of a method for magnetizing magnetless magnets included in the frame of the magnet module.

Magnetization is a process of applying an induced magnetic field to a magnetic material which has no magnet force to make a magnetic change to the magnetic material. The direction and intensity of the magnetic polarity of the product to be obtained is determined and a magnetic flux is applied as much as desired to obtain the magnetized magnet called as a permanent magnet. The magnetization operation works with the magnetizer comprising a control unit, which is a current supply device, and a yoke unit that induces a magnetic field.

In FIG. 7, since each magnet 130 included in the frame 110 must be magnetized so that a magnetic polarity occurs in the Z direction, the magnetic core 310 the end of which has a shape corresponding to the magnet 130 included in the frame 110 is disposed to face one side of each magnet 130, and a ferromagnetic body 330 electrically connected to a corresponding magnetic body core 310 and having the end the shape of which corresponds to the magnet 130 is disposed on the opposite side of each magnet 130. Ae coil 320 is wound around the magnetic core 310 and a current is applied to the coil 320 to expose the magnet 130 to the magnetic field.

That is, one end of the magnetic core 310 faces the first surface of the magnet 130 in parallel and the ferromagnetic body 330 faces the second surface of the magnet 130 in parallel so that the magnetic core 310, the ferromagnetic body 330, and the magnet 130 form a magnetic closed circuit. A current flows through the coil 320 wound around the magnetic core 310 so that the flux flows through the magnetic closed circuit. A magnetic flux Flux exits from one end of the magnetic core 310 toward the magnet 130, passes through the magnet 130 and enters the ferromagnetic body 330, whereby the magnet 130 is magnetized.

The directions in which the coils 320 are wound in two adjacent magnetic cores 310 are reversed to each other. For example, the coil 320 is wound in a clockwise CW in a first magnetic core 310, and the coil 320 is wound in a counterclockwise CCW in a neighboring second magnetic core 310, so the directions of the magnetic poles of two neighboring magnets 130 may be reversed in the frame 110.

As many magnet cores 310 as the number of magnets 130 included in the frame 110 are provided in the magnetizer, so all the magnets 130 included in the frame 110 can be magnetized at one time.

Therefore, it is possible to reduce the effort of assembling the magnet module frame while checking the magnetic pole directions of the permanent magnets one by one. Also, when fixing the permanent magnet to the opening of the magnet module frame, it is possible to prevent the inconvenience caused by the adhesive operation and prevent the adhesive from smearing and being dirty. In addition, the surface of the magnet is prevented from being damaged because the magnet is not exposed to the outside. Of course, depending on the intended use, some or all of the magnet surface may be exposed.

Figure 8:
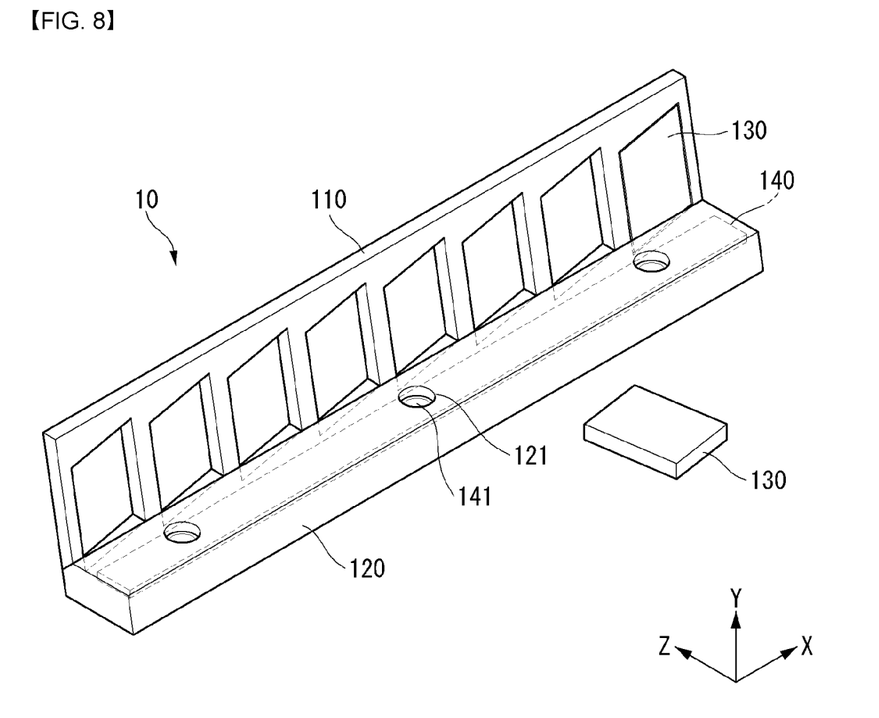
FIG. 8 shows a magnet module manufactured by an injection molding method according to another embodiment of the present disclosure.
Figure 9:
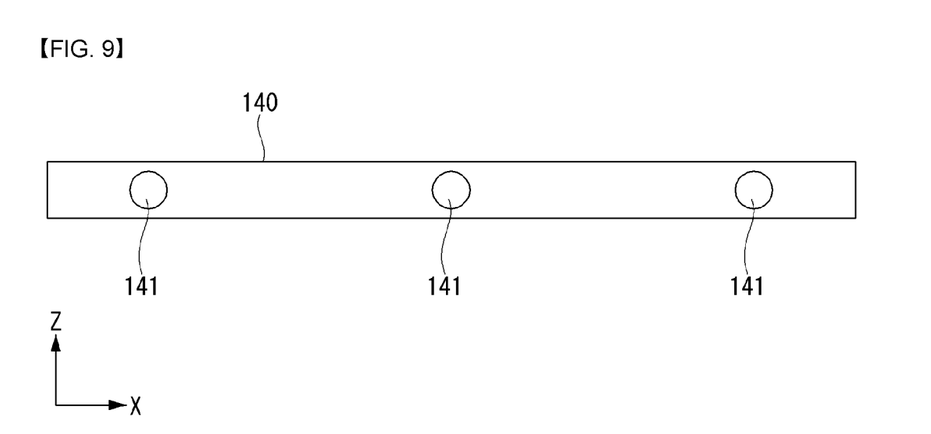
FIG. 9 shows a metal plate inserted into the base of the magnet module.

FIG. 8 shows a magnet module manufactured by an injection molding method according to another embodiment of the present disclosure, and FIG. 9 shows a metal plate inserted into the base of the magnet module. The magnet module 10 of FIG. 8 is almost the same as the magnet module 10 of FIG. 2 except that the metal plate 140 is inserted into the base 120 and the magnets 130 are exposed to the outside.

Because the length of the magnet module 10 is long in the traveling direction of the linear motor (X direction in FIG. 8) and the density of the resins constituting the frame 110 in the direction and the density of the magnets 130 fitted in the frame 110 are different from each other, there is a possibility that bending occurs in the Z direction after injection molding.

To solve this problem, in another embodiment of the present disclosure, the magnet module 10 is injection molded while the metal plate 140 is inserted into the base 120 fixed to a stator. A rectangular parallelepiped metal plate 140 that is the longest in the X direction, forms a rectangular plane in the X and Z directions, and has a thin thickness in the Y direction is fixed inside of the based 120, so the magnet module 10 can be prevented from bending. The metal plate may have a hexahedral shape forming a parallelogram plane in the X and Y directions.

In the metal plate 140, a plurality of metal plate holes 141 as many as the plurality of base holes 121 are formed in the same positions as the plurality of base holes 121 formed in the base 120. The base hole 121 may be formed at a position in the base 120 corresponding to the position which is located between two adjacent magnets 130 in the frame 110 based on the X direction that is the traveling direction and at which the resin forming the frame 110 is formed long in the Y direction, This is because the position where the magnet 130 is disposed in the frame 110 has the weakest strength.

Figure 10:
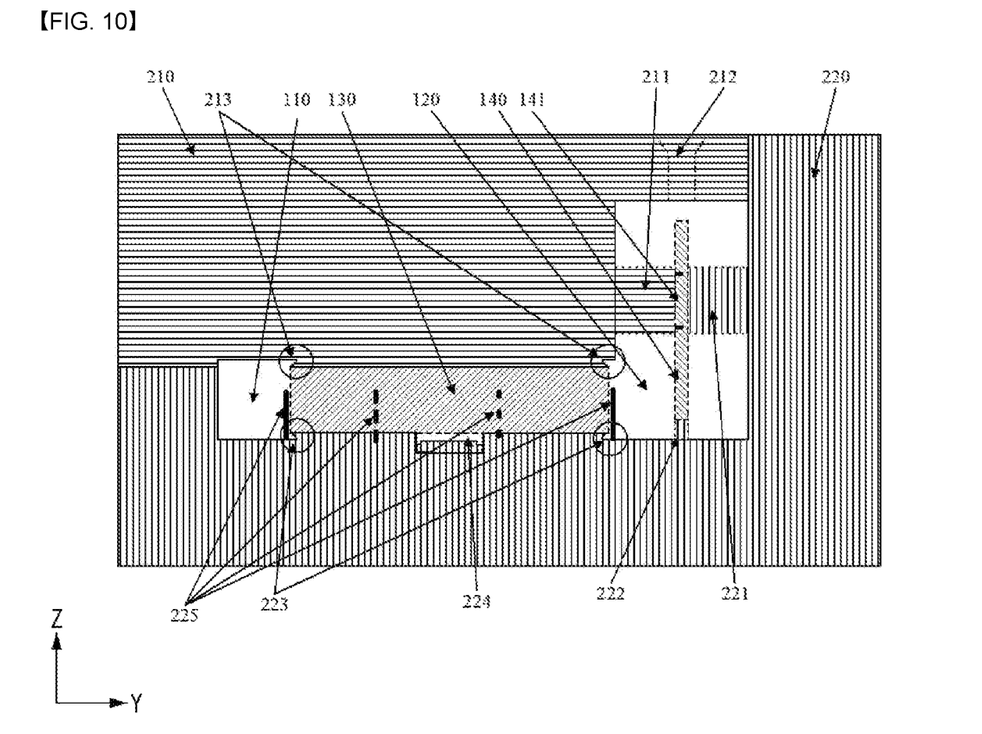
FIG. 10 shows an embodiment in which a magnetless magnet and a metal plate are fixed to a mold frame in order to manufacture a magnet module by injection molding.

FIG. 10 shows an embodiment in which a magnetless magnet and a metal plate are fixed to a mold frame in order to manufacture a magnet module by injection molding. FIG. 10 is a cross-sectional view of the magnet module 10 and the mold frames cut out based on the YZ plane in FIG. 8.

In at least two parts molded inside to fit the external shape of the magnet module 10, that is in the mold frame constituted by the first mold frame 210 and the second mold frame 220, the third fixing pins 225 are formed to protrude from the inner surface of the first frame 210 or the second frame 220.

Since the magnets 130 of the magnet module 10 in FIG. 8 are exposed to the outside unlike the FIGS. 5 and 6, the first fixing pins 216 for fixing the magnet 130 in the Z direction or the second fixing pins 226 is not required. Instead, the first mold frame 210 and the second mold frame 220 are provided with cross sections corresponding to the first/second surfaces of the magnet 130 to fix the magnet 130 in the Z direction.

Referring to FIG. 6, a plurality of third fixing pins 225 may be disposed to contact one or more sides of the right-angled rectangle formed by the first or second surface of each magnet 130 with respect to the XY plane or other surfaces except the first and second surfaces, in order to fix the magnet 130 in the X and Y directions.

In the first mold frame 210 and the second mold frame 220, resin accommodating portions 224 may be formed on at least one or both of them (in the center of the cross section) among the cross sections for fixing the magnet 130 in the Z direction. When the amount of the resin injected from the outside is more than necessary, it may be accommodated in the resin accommodating portions 224 so that there is no abnormality in the shape of the magnet module 10. Since the resin that has entered the resin accommodating part 224 is separated from the part forming the frame 120 and is hardened in the center of the magnet 130, the resin entering the resin accommodating part 224 does not form a part of the frame 110 and is separated from the magnet 120 when the first mold frame 210 and the second mold frame 220 are separated.

Since the magnet 130 is exposed to the outside in the magnet module 10 of FIG. 8, there is a possibility that the magnet 130 is separated from the frame 110. To prevent this, depressions 213 and 223 may be provided at positions corresponding to the corners or edges of the magnet 130 in the first mold frame 210 and the second mold frame 220. Then, the injected frame 110 protrudes from the surface of the magnet 130 in a direction away from the magnet 120 (that is in the Z direction) at the edges of the magnet 130, and protrudes from the edge off the magnet 130 in the XY direction toward the center of the magnet 130, thereby preventing the magnet 130 from deviating from the frame 110.

Meanwhile, since the metal plate 140 is built in the base 120 of the magnet module 10 of FIG. 8, portions for fixing the position of the metal plate 140 and forming holes in the base 120 may be provided in the first mold frame 210 and the second mold frame 220.

A plurality of protrusions 211 and 221 protruding toward each other in the Y direction are provided in the X direction in the first mold frame 210 and the second mold frame 220, thereby forming a plurality of base holes 121 in the X direction in the base 120. The ends of the protrusions 211 and 221 of the first mold frame 210 and the second mold frame 220 do not contact each other, and the ends of the protrusions 211 and 221 may determine a position of the metal plate 140 in the Y direction.

The metal plate 140 is also formed with a metal plate holes 141 in the positions corresponding to the protrusions 211 and 221, so that the magnet module 10 may be fixed to a stator (or a mover) by passing bolts through the base holes 121 and the metal plate holes 141.

In the second mold frame 220, a plurality of metal plate support portions 222 may be formed spaced apart from each other in the X direction, thereby determining the position of the metal plate 140 in the Z direction inside the base 120. Also, support portions may be formed on both sides in the X direction to determine the position of the metal plate 140 in the X direction.

In the first mold frame 210, an injection unit 212 for injecting a resin forming the appearance of the magnet module 10 may be formed at a position corresponding to the base 120.

In this way, by embedding the metal plate 140 in the base 120 of the magnet module 10, it is possible to prevent the magnet module 10 having a long length in the X direction from bending in the Z direction. that is, in the direction in which the magnetic flux of the magnet 130 proceeds.

In addition, by exposing the magnet 130 to the outside of the frame 120, it is possible to minimize the gap between the magnet 130 and the armature, thereby minimizing leakage of the magnetic flux to the outside.

Throughout the description, it should be understood by those skilled in the art that various changes and modifications are possible without departing from the technical principles of the present disclosure. Therefore, the technical scope of the present disclosure is not limited to the detailed descriptions in this specification but should be defined by the scope of the appended claims.

The invention claimed is:

1. A magnet module, comprising:
a plurality of permanent magnets arranged in a straight line along a first direction, magnet polarity directions of the plurality of permanent magnets which are parallel to a second direction being alternatively arranged in the first direction;
an injection molded frame to fix the plurality of permanent magnets;
an injection molded base in which a plurality of base holes are formed; and
a metal plate inserted into the injection molded base,
wherein the metal plate has a shape that is longest in the first direction and next longest in the second direction, and has holes formed at positions corresponding to the plurality of base holes.

2. The magnet module of claim 1, wherein the base holes are disposed at a position corresponding to a position between two adjacent permanent magnets in the injection molded frame, based on the first direction.

3. The magnet module of claim 1, wherein the permanent magnets are exposed to the outside, and wherein the injection molded frame protrudes from a surface of the permanent magnets having a shape of a hexahedron in a direction away from the permanent magnets along the second direction at positions corresponding to edges of the permanent magnets, and protrudes from the positions corresponding to the edges toward a center of the permanent magnets along the first direction and a third direction perpendicular to the first and second directions.

4. The magnet module of claim 1, wherein the plurality of base holes are drilled in a third direction perpendicular to the first and second directions.

5. The magnet module of claim 1, wherein the injection molded frame and the injection molded base form an L-shape in a cross section perpendicular to the first direction.

6. A magnet module, comprising:
a plurality of permanent magnets arranged in a straight line along a first direction, magnet polarity directions of the plurality of permanent magnets which are parallel to a second direction being alternatively arranged in the first direction;
an injection molded frame to fix the plurality of permanent magnets; and
an injection molded base in which a plurality of base holes are formed,
wherein the permanent magnets are exposed to an outside, and
wherein the injection molded frame protrudes from a surface of the permanent magnets having a shape of a hexahedron in a direction away from the permanent magnets along the second direction at positions corresponding to edges of the permanent magnets, and protrudes from the positions corresponding to the edges toward a center of the permanent magnets along the first direction and a third direction perpendicular to the first and second directions.

* * * * *